United States Patent Office
2,828,291
Patented Mar. 25, 1958

2,828,291

RESINOUS CONDENSATION PRODUCTS OF A GLYCOL, A DIAMINE, AND A UREA OR DERIVATIVE THEREOF

James H. Saunders, Anniston, Ala., assignor to Monsanto Chemical Company, St. Louis, Mo., a corporation of Delaware No Drawing. Application June 29, 1953
Serial No. 364,931

5 Claims. (Cl. 260—77.5)

This invention relates to new, resinous materials and particularly to those resinous materials suitable for use as adhesives.

According to the present invention new, resinous materials are prepared by condensing a compound having the structure:

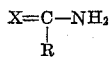

where X is O, NH or S and R is selected from the group consisting of NH₂ and

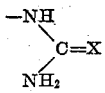

with a polyalkylene glycol and a diamine, the proportions of the three components being as described hereinafter.

Compounds having the structure:

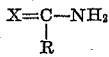

and useful in the present invention are: urea, thiourea, guanidine, biruet and thiobiruet.

The polyalkylene glycol component should be a polyethylene glycol or substituted polyethylene glycol containing at least 4 ethenoxy groups but not in excess of 45 ethenoxy groups in the molecule. The alkylene oxide component may be defined as ethylene oxide or an alkyl or aryl derivative of ethylene oxide and structurally may be considered as having the following formula:

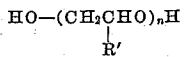

where R' is selected from the class consisting of H, CH₃ and phenyl and $n$ is a whole number having a value of at least 4 but not in excess of 45.

For the preparation of suitable polyalkylene glycol derivatives ethylene oxide, propylene oxide or styrene oxide or mixtures thereof may be polymerized in known manner until at least 4 ethenoxy or substituted ethenoxy groups but not in excess of 45 such groups have been combined in one molecule.

The diamine component employed in the preparation of the present resinous bodies may be any aliphatic or aromatic diamine. In the case of aromatic diamines, the amino groups are preferably attached to different aromatic nuclei. In the case of aliphatic diamines the amino groups should be separated by at least 3 atoms.

Suitable diamines are: p,p'-diaminodiphenylsulfone, p,p'-diaminodiphenylmethane, benzidine, trimethylene diamine, 2,4-tolylene diamine, p- phenylene diamine, o-tolidine, o-dianisidine, 1,4-diaminonaphthalene, 1,5-diaminonaphthalene, tetramethylene diamine, pentamethylene diamine, hexamethylene diamine, decamethylene diamine.

For the successful preparation of resinous materials suitable for use as adhesives, it is necessary in proportioning the ingredients to be reacted together that consideration be given to two ratios, the values of which should be maintained within the limits here given.

(1) $\dfrac{\text{Moles of } X{=}\underset{\underset{R}{|}}{C}{-}NH_2}{\text{Active hydrogen groups}}$ = at least 0.25 but not in excess of 1.5

(2) $\dfrac{\text{Moles of diamine}}{\text{Moles of glycol}}$ = at least 0.25 but not in excess of 4.0

The active hydrogen atoms employed in the first ratio above are those found to be "active" by the recognized Zerewitinoff method. Thus a glycol and a diamine each has two active hydrogen groups.

The reacting ingredients proportioned in accordance with the above two ratios are introduced into a reaction vessel which is provided with heating means. Generally stirring of the reaction ingredients is desirable, although not necessary since evolution of a gas generally results in sufficient agitation. The reaction may, if desired, be carried out in the presence of a solvent. For this purpose any suitable high boiling organic liquid which is a solvent for the reactants may be used. In the event that the solvent so chosen is a non-solvent for the resinous materials produced by the condensation, the method utilizing such non-solvent is not necessarily rendered inoperative. In this event the resinous materials at a certain stage in the condensation separate out as a second liquid phase and may be separated by any suitable phase separation method. Suitable solvents in which the reaction can be carried out may be any of the following: Chlorinated biphenyls, chlorinated naphthalenes, dimethylformamide, diethylene glycol dimethyl ether, triethylene glycol dimethyl ether, diethyl phthalate, pyridine, triethylamine, N-methylmorpholine.

The present reaction may be carried out at temperatures which range from about 90° C. to about 225° C. According to my observations the reaction between the ingredients starts at about 95° C. and progresses smoothly as the temperature is raised to the higher limit. A basis gas, identified as ammonia, is liberated from the reaction mass commencing at about 95° C.

The temperature and time of treatment employed for the condensation of the reactants will vary with the specific ingredients employed in the process and will not necessarily be the same for the several alternative materials included herein. The degree of condensation as measured by the melting point or solubility of the resinous product will depend upon the time and temperature of heating, in general these properties increasing with the intensity of heating or duration of heat treatment. The resinous compositions are generally insoluble in most solvents and in water, however dimethylformamide is a suitable solvent for these resins, should solutions be desired. One skilled in the art having had the benefit of the present disclosure will be able to successfully practice the process and realize the benefits and advantages thereof.

The present invention is illustrated by the following examples:

*Example 1*

Eighteen grams (0.3 mole) of urea, 40 g. (0.1 mole) of polyethylene glycol having a molecular weight of 400 and 21 g. (0.2 mole) of p-phenylene diamine were mixed together in a glass flask and heated on a water bath at 90–95° C. for about one hour. During this time the material changed from a brown mush to a fluid mixture. The reaction product was then heated on a hot plate to 130–150° C. for about one-half hour, during which time it bubbled fairly vigorously. It was then heated to 170–180° C. for three-fourths of an hour. It was fairly solid at 170° C. At the end of this time it rapidly solidified upon cooling.

Example 2

Nine grams (0.15 mole) of urea, 20 g. (0.05 mole) of polyethylene glycol, M. W. 400, and 25 g. (0.1 mole) of p,p'-diamino diphenylsulfone were mixed together in a reaction flask and heated on a water-bath at 90–95° C. for one hour, after which the material had the appearance as in Example 1, above. The product was then further heated for the time and temperature as described in Example 1 above, the final product being a clear liquid at 150° C. and becoming solid at room temperature.

Example 3

Eighteen grams (0.3 mole) of urea, 43 g. (0.11 mole) of polyethylene glycol, M. W. 400, and 14.8 g. of trimethylene diamine were mixed together and heated in a glass flask on a water-bath at a temperature of 90–95° C. for one hour. The material was a water-white mush originally, eventually forming a clear liquid at 170° C.

Example 4

This example illustrates the condensation carried out in the presence of a solvent.

One hundred grams of dimethylformamide, 12.5 g. of diamino diphenylsulphone, 10 g. of polyethylene glycol, M. W. 400, 4.5 g. of urea were mixed together and heated slowly to 120° C. and then further heated to 148° C. Gentle gas evolution started at 120° C. and continued to 148° C. After two hours at 148° C. the clear, dark-red solution was coated on aluminum blocks which were then warmed in an air oven to evaporate the solvent. They were then joined and cooled. A satisfactory bond had formed. The product formed a firm but flexible coating on metal.

Example 5

Two aluminum blocks of approximately 0.4 square inch area were warmed and cemented together by placing a drop of resinous condensation product produced in Example 2 above, on adjacent surfaces. The joined block was then allowed to cool. The blocks were then subjected to a gradually increasing tension in a tensile test machine until failure took place, which occurred under a load of 215 p. s. i.

The present resinous products may be employed to adhesively bond various structural elements together such, for example, as wood to wood, glass to glass, fiber board to fiber board, cloth to cloth, paper to paper, regenerated cellulose to regenerated cellulose, cellulose esters to cellulose esters, gelatin to gelatin, mica to mica, steel to steel, steel to glass, steel to aluminum, steel to celluose acetate, steel to acrylic plastics, steel to vinyl plastics, steel to wood, a sheet of metal foil to a moisture-proof material comprising a cellulosic material and various combinations of these and other bases. Cured films of the resins have good adhesion on metal surfaces and may be used as protective coatings.

What I claim is:

1. The resinous condensation product obtained by heating to a temperature of at least 90° C. a mixture comprising the following reactants: (1) a compound of the formula:

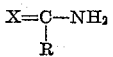

where X is selected from the group consisting of O, S and NH and R is selected from the group consisting of —NH$_2$ and

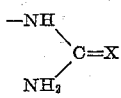

(2) an alkylene glycol having at least 4 but not in excess of 45 alkylene oxide groups in the molecule and (3) a diamine, in which the amino groups are separated by at least 3 atoms, said diamine containing only NH$_2$ groups and no other active hydrogen containing groups, the relative proportions of said reactants in said mixture being such as to satisfy the ratio:

$$\frac{\text{Moles } X=\overset{R}{\underset{|}{C}}-NH_2}{\text{Active hydrogen groups}} = \text{at least 0.25 but not in excess of 1.5}$$

in which ratio the active hydrogen groups are the active hydrogen groups present in said glycol and diamine, the proportions of said reactants also satisfying the ratio:

$$\frac{\text{Moles of diamine}}{\text{Moles of glycol}} = \text{at least 0.25 but not in excess of 4.0}$$

2. The condensation product defined in claim 1 in which the alkylene glycol is a polyethylene glycol.

3. The condensation product defined in claim 1 in which the compound:

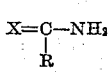

is urea.

4. The condensation product defined in claim 1 in which the diamine is diaminodiphenylsulfone.

5. The condensation product defined in claim 1 in which the alkylene glycol is a polyethylene glycol having a molecular weight of about 400.

References Cited in the file of this patent

UNITED STATES PATENTS

| | | |
|---|---|---|
| 2,155,328 | Paquin | Apr. 18, 1939 |
| 2,374,648 | Burke et al. | May 1, 1945 |

FOREIGN PATENTS

| | | |
|---|---|---|
| 894,764 | France | Jan. 5, 1945 |